(12) United States Patent
Kanyuk et al.

(10) Patent No.: US 8,531,466 B2
(45) Date of Patent: Sep. 10, 2013

(54) METHODS FOR PROVIDING REALISTIC ANIMATION OF AUTONOMOUS OBJECTS THROUGH IMPROVED ANIMATION CONTROL SIGNAL PROCESSING

(75) Inventors: Paul Kanyuk, Berkeley, CA (US); Christopher Lawrence, Dyrham (GB)

(73) Assignee: Pixar, Emeryville, CA (US)

( * ) Notice: Subject to any disclaimer, the term of this patent is extended or adjusted under 35 U.S.C. 154(b) by 1020 days.

(21) Appl. No.: 12/277,209

(22) Filed: Nov. 24, 2008

(65) Prior Publication Data

US 2009/0309882 A1 Dec. 17, 2009

Related U.S. Application Data

(60) Provisional application No. 61/061,469, filed on Jun. 13, 2008, provisional application No. 61/088,296, filed on Aug. 12, 2008.

(51) Int. Cl.
*G06T 13/00* (2011.01)

(52) U.S. Cl.
USPC .......................................................... 345/474

(58) Field of Classification Search
USPC ................................................. 345/473, 474
See application file for complete search history.

(56) References Cited

U.S. PATENT DOCUMENTS

| | | | | |
|---|---|---|---|---|
| 4,553,221 A | * | 11/1985 | Hyatt | 708/308 |
| 5,384,912 A | * | 1/1995 | Ogrinc et al. | 345/501 |
| 6,714,201 B1 | * | 3/2004 | Grinstein et al. | 345/474 |
| 2006/0192783 A1 | | 8/2006 | Kass et al. | |
| 2007/0035543 A1 | * | 2/2007 | David et al. | 345/420 |

OTHER PUBLICATIONS

Herbert Stocker; "Linear Filters—Animating Objects in a Flexible and Pleasing Way;" Proceedings Web3D 2006, pp. 119-129, Columbia, Maryland, Apr. 18-21, 2006, Association for Computing Machinery, Inc.,.*
Kanyuk, P. et al., "Tilting the Axiom: Large Scale Crowd Physics for WALL-E," Aug. 2008, 1 page.

* cited by examiner

*Primary Examiner* — Edward Martello
(74) *Attorney, Agent, or Firm* — Kilpatrick Townsend & Stockton LLP

(57) ABSTRACT

Systems and methods for creating autonomous agents or objects. Agents reactions to physical forces are modeled as springs. A signal representing a force or velocity change for one animation control is processed to produce realistic reaction effects. The signal may be filtered two or more times, each filter typically having a different time lag and/or filter width. The filtered signals are combined, with weightings, to produce an animation control signal. The animation control signal is then applied to the same or a different animation control to influence motion of the object or agent.

17 Claims, 5 Drawing Sheets

METHODS FOR PROVIDING REALISTIC ANIMATION OF AUTONOMOUS OBJECTS THROUGH IMPROVED ANIMATION CONTROL SIGNAL PROCESSING

CROSS-REFERENCES TO RELATED APPLICATIONS

The present application claims priority to and is a non-provisional application of U.S. Provisional Patent Ser. No. 61/061,469, filed Jun. 13, 2008 and 61/088,296, filed Aug. 12, 2008, the disclosures of which are each hereby incorporated by reference in its entirety for all purposes.

BACKGROUND

The present invention relates generally to computer graphics and animation, and more particularly to systems and methods for rendering a crowd of characters in an animation scene.

Currently, 3D animation systems are used to generate visual effects. Massive is an example of a 3D animation system for generating crowd-related visual effects for film and television. Using Massive, a user such as an animator or technical director designs characters with a set of reactions responsive to what is going on around them. The reactions of the characters determine what those characters do and how they do it. Their reactions can even simulate emotive qualities such as bravery, weariness, or joy. The agent reactions can control key-framed or motion captured animation clips called actions. Characters that perform on their own in this way are referred to as agents. Massive is a system for designing and running such agents. When scaled up into the hundreds, thousands or hundreds of thousands, the interaction within the crowd that emerges from these individuals can be highly realistic. By building variation into an agent, the Massive artist can populate a scene with individuals who are unique in everything from physical appearance to how they respond.

One technical challenge in animated films involving a large number of characters in a crowd, such as crowds of humans and robots in Wall E, is creating believable physics for the crowds of humans and robots. In numbers as high as ten thousand or more, crowd agents may participate in a variety of scenarios ranging from the fantastical "tilting" of a spaceship to the rapid flight of robots through winding halls and corridors. Many of these shots feature crowds as the foreground elements, and require a high level of dynamic interaction between crowd agents and each other, as well as with their environments. On its own, Massive or similar systems may not create satisfactory dynamic interactions between crowd agents, or realistic physical movement of agents in complex environments.

Therefore it is desirable to provide systems and methods that overcome the above and other problems.

BRIEF SUMMARY

Systems and methods are provided for creating autonomous agents or objects in computer graphics and/or animation scenes.

In certain aspects, agents reactions to physical forces are modeled as springs. A signal representing a force or velocity change for one animation control is processed to produce realistic reaction effects. The signal in certain aspects is filtered two or more times, each filter typically having a different time lag and/or filter width. The filtered signals are combined, with weightings, to produce an animation control signal. The animation control signal is then applied to the same or a different animation control to influence motion of the object or agent.

According to one embodiment, a computer implemented method is provided for creating autonomous objects in a computer animated movie or game. The method typically includes receiving an animation control signal related to an animation object for a first animation control, filtering the animation control signal with two or more filters to produce two or more corresponding filtered signals, wherein at least one of the filters has a non-zero time offset or time lag, and applying a weighting to each filtered signal to produce two or more corresponding weighted filtered signals. The method also typically includes adding some or all of the two or more weighted filtered signals together to produce a filtered animation control signal, and applying the filtered animation control signal to influence the motion of the animation object when displayed. In certain aspects, the filtered animation control signal is applied to the first animation control. In certain aspects, the filtered animation control signal is applied to a second animation control different than the first animation control. In certain aspects, the first animation control includes one of a translation control, an acceleration control and/or a rotation control. In certain aspects, the method further includes displaying the motion of the animation object based on the applied filtered animation control signal.

According to another embodiment, a computer readable medium is provided that stores code which, when executed by a processor, causes the processor to create autonomous animation objects. The code typically includes instructions to receive an animation control signal related to an animation object for a first animation control, to filter the signal with two or more filters to produce two or more corresponding filtered signals, wherein at least one of the filters has a non-zero time offset, and to apply a weighting to each filtered signal to produce two or more corresponding weighted filtered signals. The code also typically includes instructions to add some or all of the two or more weighted filtered signals together to produce a filtered animation control signal, and to apply the filtered animation control signal to influence the motion of the animation object. In certain aspects, the filtered animation control signal is applied to the first animation control. In certain aspects, the filtered animation control signal is applied to a second animation control different than the first animation control. In certain aspects, the first animation control includes one of a translation control, an acceleration control and/or a rotation control.

According to yet another embodiment, an animation system is provided. The system typically includes a processor, and a memory module storing code which, when executed by the processor, causes the processor to create autonomous animation objects. The code typically includes instructions to receive an animation control signal related to an animation object for a first animation control, to filter the signal with two or more filters to produce two or more corresponding filtered signals, wherein at least one of the filters has a non-zero time offset, and to apply a weighting to each filtered signal to produce two or more corresponding weighted filtered signals. The code also typically includes instructions to add some or all of the two or more weighted filtered signals together to produce a filtered animation control signal, and to apply the filtered animation control signal to influence the motion of the animation object when displayed. In certain aspects, the filtered animation control signal is applied to the first animation control. In certain aspects, the filtered animation control signal is applied to a second animation control different than the first animation control. In certain aspects, the first animation control includes one of a translation control, an acceleration control and/or a rotation control. In certain aspects, the system includes a display adapted to display the motion of the animation object based on the applied filtered animation control signal.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DRAWINGS

DETAILED DESCRIPTION

General Overview

Figure 1:
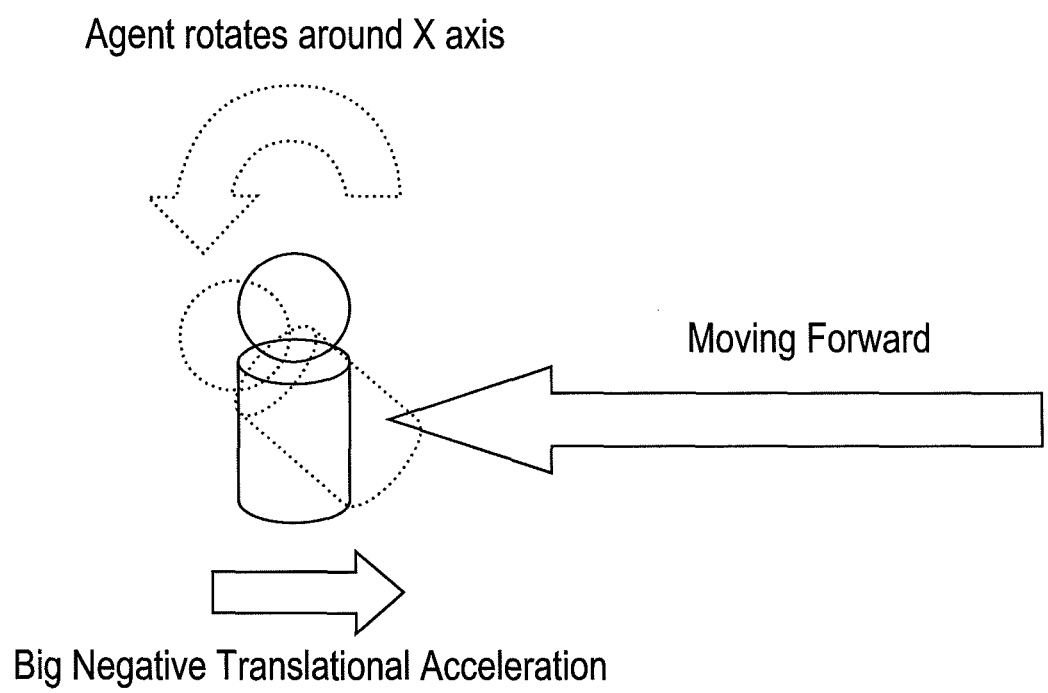
FIG. 1 shows an example of an applied signal and successive filtered signals that create a "bounce" effect when a character stops according to one embodiment.

Systems and methods are provided for controlling animated agents. In certain aspects, agents reactions to physical forces are modeled as springs. An animation control signal representing a force (e.g., acceleration) or velocity change for one animation control (e.g., translational velocity or acceleration control) is processed to produce realistic reaction effects. The animation control signal in certain aspects is filtered two or more times, each filter typically having a different time lag and/or filter width. In certain aspects, at least one applied filter has a non-zero time offset or lag. The filtered signals are combined, with weightings, to produce a filtered animation control signal. The filtered animation control signal is then applied to the same or a different animation control (e.g., rotational velocity) to influence motion of the object or agent. In this manner, the filters represent the dynamic response of the animation agent or object (e.g., character) to an acceleration or rate of change.

Such embodiments address the technical challenges in animated films involving a large number of characters in a crowd, such as crowds of humans and robots in Wall-E, by creating believable physics for the crowds of humans and robots. In numbers as high as ten thousand, crowd agents may participate in a variety of scenarios ranging from the fantastical "tilting" of a spaceship to the rapid flight of robots through winding halls and corridors. Shots may feature crowds as the foreground elements, and require a high level of dynamic interaction between crowd agents and each other, as well as with their environments. To meet this goal, in one embodiment, a crowd pipeline is extended to incorporate rigid body dynamics (e.g., using ODE (the Open Dynamics Engine)), and implement a fuzzy logic-based spring physics system in a 3D animation system such as Massive, which was adapted to drive skeletal chains and key-frame animated motion cycles. For example, these techniques could be used to create the giant "Axiom tilt" effect and general crowd locomotion.

1 Locomotive Physics

One of the unique and defining aspects of the crowds in Wall-E is their reliance on "flight", or rather a futuristic propulsion system, to achieve locomotion. This applies to robots flying through hallways as well as humans leisurely drifting on self-propelled lounge chairs. To implement a realistic propulsion system, a previously developed pipeline was adapted to harness the procedural motion authoring techniques of Massive, yet preserve the articulation nuances of the rigging software. Within this framework, three main elements of propulsion or locomotion are provided: reaction, hover and anticipation.

"Reaction" is the natural motion that results from the physical forces of locomotion (e.g., whiplash, overshoot, sway, etc.) as opposed to the intent of the agent. Advantageously, it was found that these effects are well modeled using spring dynamics. Hence, in one embodiment, rather than use a physical simulator, a spring model is implemented within the agent brains using fuzzy logic nodes to achieve both better integration with the motion cycles and greater interactivity and parameterization. In one embodiment, the spring model includes a filtered, shifted, and scaled version of the original signal, added upon a second filtered, shifted and scaled version (e.g., at the negated and halved magnitude with double the filtering and offset). This is, in effect, a two oscillation spring that is rapid to run and easy to tune.

As an example, consider a flying agent coming to an abrupt stop as shown in FIG. 1. One would expect the agent to rock back and forth due to a sudden applied negative translational acceleration. The reaction, rocking back and forth, would be damped harmonic rotation around the x-axis. Thus, the negative translational acceleration (e.g., along y-axis) is processed in the agent brain into a harmonic signal that is used to drive the rotation around the x-axis (Rx).

Figure 2:
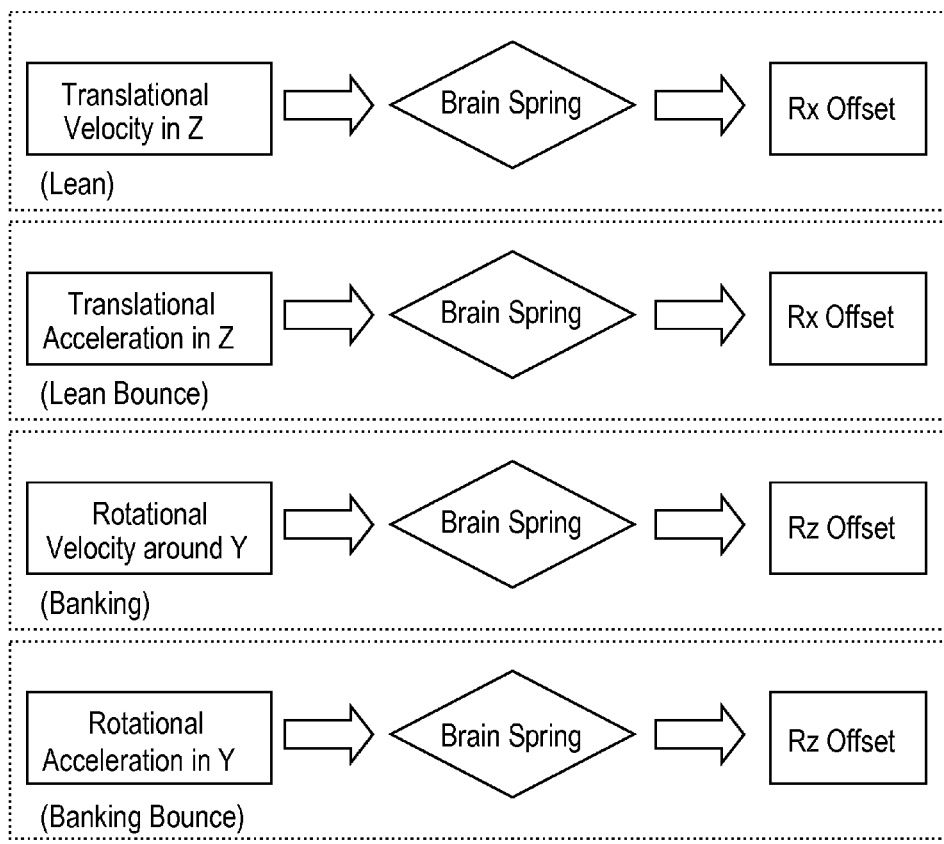
FIG. 2 illustrates examples of relationships between changes in velocity and acceleration and reaction.

FIG. 2 illustrates examples of relationships between changes in velocity and acceleration and reaction. As shown, the brain spring module of each agent establishes the relationship. In certain aspects, physical signals are processed in an agent's brain to emulate springy reaction effects such as leaning, banking, bounce, etc. In one aspect, for example, an agent brain contains springs for rotational and translation acceleration for bounce, and springs for rotational and translation velocity for leaning/banking. The outputs are then layered on top of the existing animation. This advantageously provides convincing reaction of the root transforms for each agent.

According to one embodiment, each brain spring is modeled as a set of two or more filters. For example, in one embodiment:

$$bspring(x) = \Sigma_{i \in [0,n]} \text{filter}(a, wi, di) * x$$

where:

a is a set of n amplitudes with monotonically decreasing magnitudes and alternating signs (e.g., n=4, a=[−2, 1, −0.5, 0.25]);

wi is a set of n filter widths with monotonically increasing values (e.g., n=4, w=[0.5, 1, 2, 4]); and di is a set of n delays with monotonically increasing values (e.g., n=4, d=[0, 0.1, 0.2, 0.4]).

It should be appreciated that n is 2 or more and that a, w and d can take on any other values as desired, and that signs need not alternate and that values need not monotonically increase. Advantageously, brain springs can be used to modify any aspect of the agent's motion, not just the original signal processed. For example, using the situation above, a translational control, such as Tz, can be used to modify a different control, such as Rx.

Figure 3:
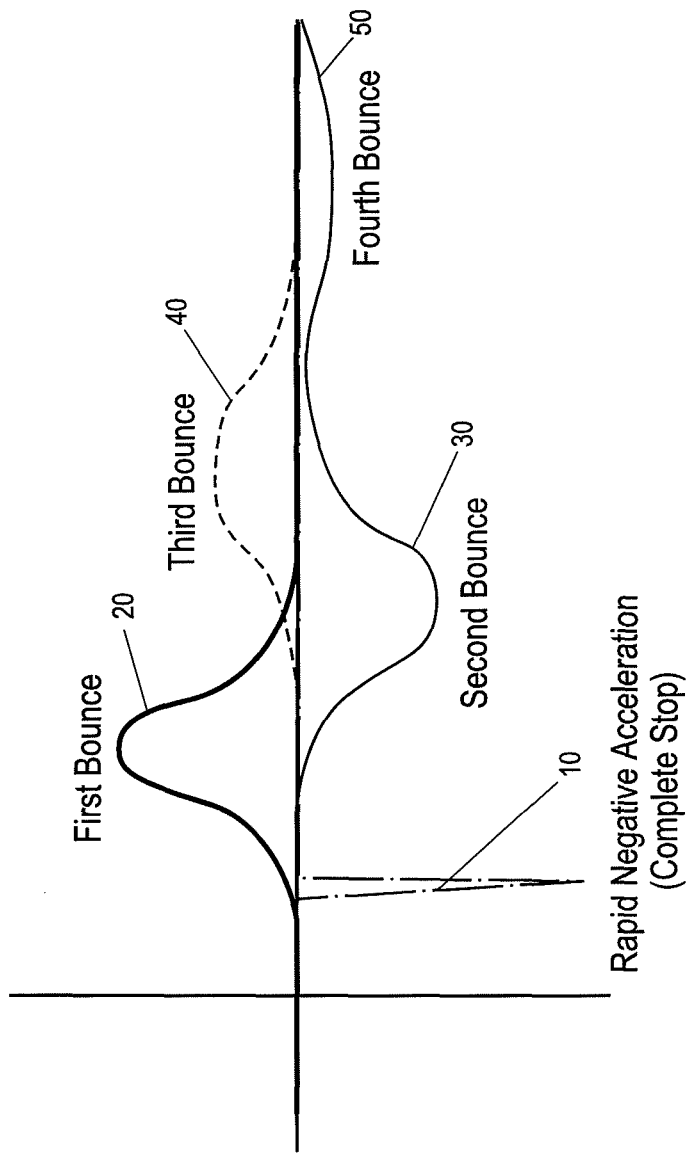
FIG. 3 shows an example of an applied signal and successive filtered signals that create a "bounce" effect when a character stops according to one embodiment.

FIG. 3 shows an example of an applied signal and successive filtered signals that create a "bounce" effect when a character stops according to one embodiment. As shown in FIG. 3, an acceleration force is treated as a signal, e.g., a spring force in the opposite direction of motion. Such a signal can be implemented in many ways, for example drawing a line or color over an area where the agent will pass. In general, any arbitrary input such as any spatially authored input can be used to initiate the process. For example, a texture map on the ground can be used to trigger the dynamic response implemented by the filters (e.g., in Massive, ray casting to ground will detect the texture map, line, color or other arbitrary input). The input signal 10 is measured and filtered, delayed and multiplied by a scale factor (e.g., negative amplitude) to become a first filtered signal (e.g., first bounce 20 as shown in FIG. 3). Signal 10 is then filtered with a larger filter width, longer delay, and positive amplitude with smaller magnitude to produce a second filtered signal (e.g., second bounce 30 as shown in FIG. 3. The signal may be processed further to produce the third and fourth filtered signals (e.g., third bounce 40 and fourth bounce 50). The process may continue. Some or all of the filtered signals are added together to produce a filtered animation control signal. It should be appreciated that weightings may be applied during filtering or after filtering. For example, the reduction in magnitude for each filtered signal may be applied during filtering or upon adding the signals together to create the animation control signal. In the end, an oscillating animation control signal that looks much like a damped harmonic motion signal is produced.

Each filter, in one aspect, has a time lag control. In this manner a character, or a portion of a character, can be controlled to bounce or sway back and forth when stopping to create a realistic effect by successively decreasing the magnitude of the filter and/or increasing the filter width. Similarly, controls may be applied to certain parameters to create various effects. For example, a control may be applied to a translational velocity parameter to create a lean effect, a control may be applied to a translation acceleration parameter to create a lean bounce effect, a control may be applied to rotational velocity parameter to create a banking effect, and a control may be applied to a rotational acceleration parameter to create a banking bounce effect. In certain aspects, these controls and others are provided to animators or other users as part of a graphical user interface. In general, filters can be applied to any of a translation control, rate control and/or acceleration control (including rotation, rotational rate and rotational acceleration controls).

Figure 4:
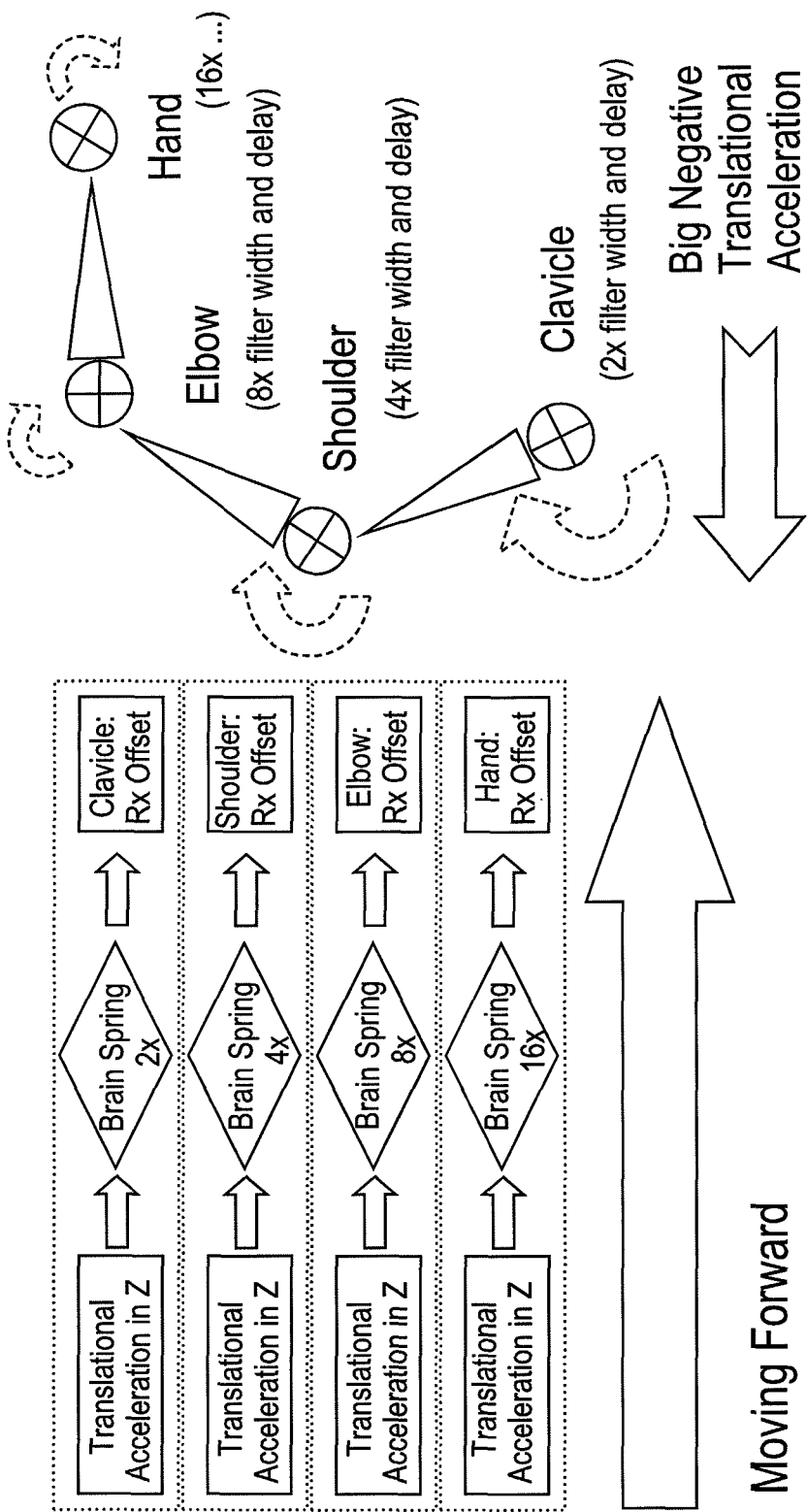
FIG. 4 illustrates an embodiment for propagating reaction forces down nodes of a hierarchical or tree type structure, such as limbs of a character.

Many robots or other types of characters have limbs that would naturally react to forces differently from the body as a whole. Thus, in one embodiment, different signals and/or filters (e.g., width and magnitude/weighting) are applied to different body parts to adjust for different masses of the body parts. Also, to model this, in one aspect, fuzzy logic springs (similar to the above springs) are applied to individual joint rotations, with varying amplitudes and frequencies. In certain aspects, more filtering and delay are applied to the springs further down the skeletal chain. In this manner, more realistic motion of the characters and character parts is realized. FIG. 4 illustrates an embodiment for propagating reaction forces down nodes of a hierarchical or tree type structure, such as limbs of a character. As shown, a translational acceleration control (Tz) is used to control rotational reaction (e.g., about the x-axis) for various nodes of a structure or skeleton. For example, for each successive node, larger filters, smaller amplitudes and/or longer delays can be used to process the signal as the skeletal chain is traversed. This causes the limbs to have overlapping and delayed motion relative to the root node of the agent/character.

"Hover" is the naturalistic oscillation in translation and rotation that keeps a floating agent from looking abnormally static (as if balanced between slowly varying forces). One effect is a rocking and sway of an agent in translation and rotation. In one aspect, a user such as an animator key-frames a canonical hover cycle, which may be modeled in Massive using noise functions at specified phase differences, but with parameters to control amplitude, phase offsets, curve shaping, and frequency as whole or by degree of freedom (e.g., translational axes, rotational axes). In certain aspects, the hover is modeled as sine waves with specific user defined phase offsets. A set of parameters per agent type is then created to define their personality through hover (e.g., a small energetic cleaning robot might have a very high frequency hover, whereas a large lumbering cargo-bot might have broader noise curves). In certain aspects, these control parameters are provided to animators or other users as part of a graphical user interface so as to change the frequency, phase, amplitude, etc. of the hover signals for each degree of freedom (e.g., Rx, Ry, Rz, Tx, Ty, Tz).

"Anticipation" is the tendency of a flying agent to lean into a turn before actually reaching it, which is a natural reaction for rapid balanced locomotion (think ice skaters or bicyclists). In one aspect, this effect is modeled in the agent brains by looking ahead of an agent's path (e.g., a spline) and measuring the difference in path orientation, which drives lean rotation. For example, the agent's angle/orientation is compared with that of the path a certain distance ahead. Where extreme speeds of the agents and frequency of turns occurs, this signal may be very ragged, and require smoothing post simulation using a quaternion filter for the euler angles and standard techniques for the root translation.

2 Tilt Physics

In certain situations involving hundreds or thousands of characters, it is desirable to provide realistic effects for the characters reacting together to similar physical forces, e.g., falling together and "flailing". For example, during the finale of Wall-E, the spaceship Axiom tilts and the crew (approximately 8,000 agents) falls from their hover chairs, slide, and pile up at the base of the ship. Given the complex physical interaction of the situation and the scale of the crowd, the existing pipeline using Massive for procedural motion would not suffice. Accordingly, in one embodiment, a rigid body simulation engine is integrated into the animation system using ODE (the Open Dynamics Engine). ODE is designed for rapid if approximate rigid body dynamics (suitable for real time applications), and scales well for large crowds. Massive itself contains an ODE solver built in, but it is not scriptable enough to tackle the complex situations required (e.g., animated constraints and material properties, etc.). As such, in certain aspects, crowd physics are modeled and scripted in an external application, such as Maya, and the resulting data exported for use in Massive. In certain aspects, an application such as a plug-in may be used to communicate data back and forth between Maya and ODE. This data is treated as the root transformations of the agents, on top of which motions cycles and procedural animation are layered. To do so, in one embodiment, the same fuzzy logic spring designed for locomotion reaction are used. Rather than creating simple reaction rotations, however, the outputs of the springs are used to drive blends between custom motion cycles. As a result, the physical forces measured by the springs influences the motion of the character. For instance, a "panicked flailing" motion cycle as well as a version of it under the influence of forces from the 6 axis directions may be implemented. Then, based on the magnitude and direction of translational acceleration, the agent would blend their flailing cycles accordingly. This advantageously allows for the results of the rigid body simulation to be used to influence acting of the agents, and really bring the crowd to life. All in all, brain based springs allow for rapid iteration and tuning of physics on very large crowds, and rigid body dynamics is a valuable tool for driving key-frame animation to create compelling simulations.

3. General System Architecture

Figure 5:
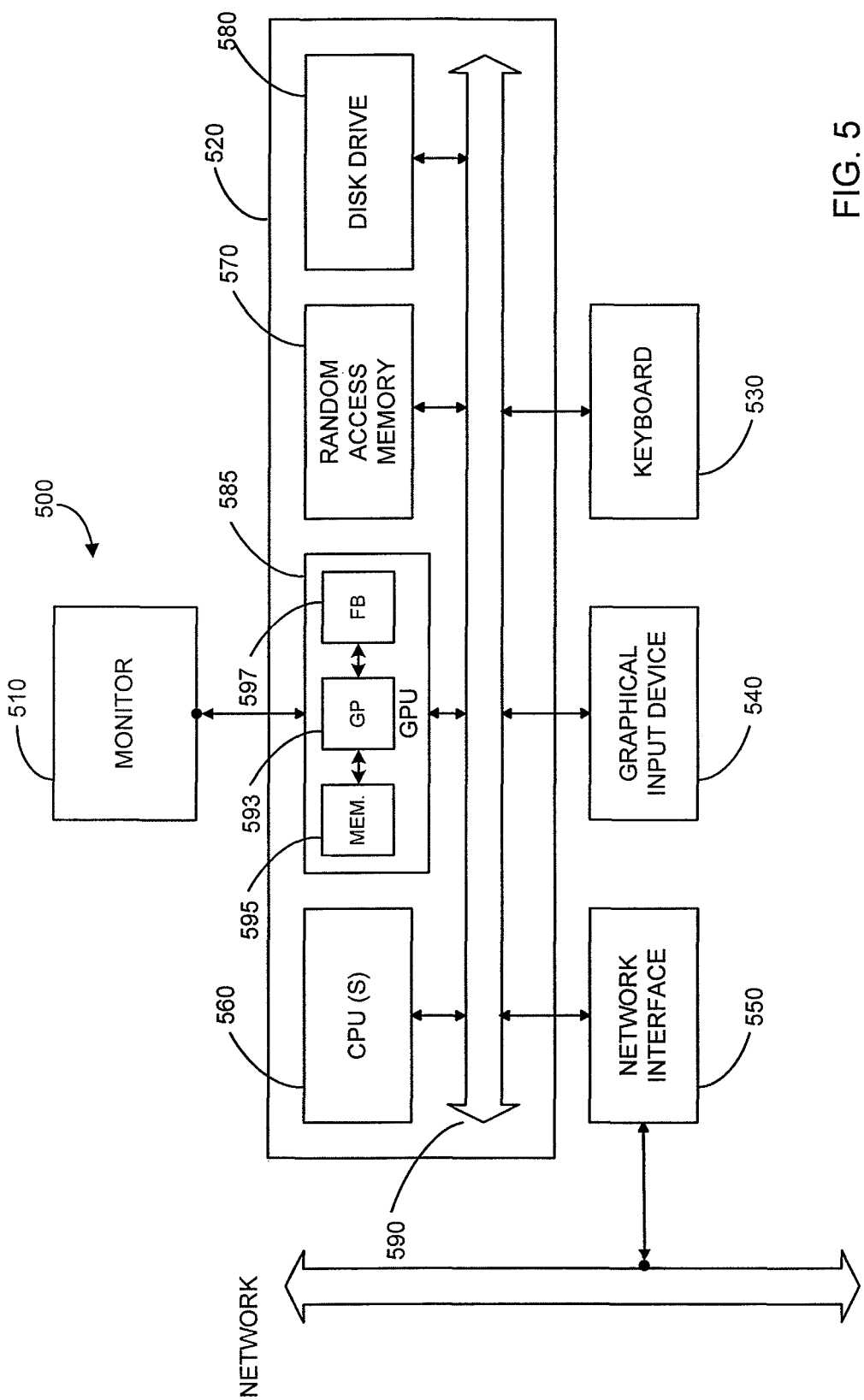
FIG. 5 is a block diagram of a computer system that may be used to practice embodiments of the present invention.

FIG. 5 is a block diagram of a computer system that may be used to practice embodiments of the present invention. FIG. 5 is merely illustrative of an embodiment incorporating the present invention and does not limit the scope of the invention as recited in the claims. One of ordinary skill in the art would recognize other variations, modifications, and alternatives.

In one embodiment, computer system 500 typically includes a monitor 510, computer 520, a keyboard 530, a user input device 540, computer interfaces 550, and the like.

In various embodiments, user input device 540 is typically embodied as a computer mouse, a trackball, a track pad, a joystick, wireless remote, drawing tablet, voice command system, eye tracking system, and the like. User input device 540 typically allows a user to select objects, icons, text and the like that appear on the monitor 510 via a command such as a click of a button or the like.

Embodiments of computer interfaces 550 typically include an Ethernet card, a modem (telephone, satellite, cable, ISDN), (asynchronous) digital subscriber line (DSL) unit, FireWire interface, USB interface, and the like. For example, computer interfaces 550 may be coupled to a computer network, to a FireWire bus, or the like. In other embodiments, computer interfaces 550 may be physically integrated on the motherboard of computer 520, and may be a software program, such as soft DSL, or the like.

In various embodiments, computer 520 typically includes familiar computer components such as a processor 560, and memory storage devices, such as a random access memory (RAM) 570, disk drives 580, a GPU 585, and system bus 590 interconnecting the above components.

In some embodiment, computer 520 includes one or more Xeon microprocessors from Intel. Further, one embodiment, computer 520 includes a UNIX-based operating system.

RAM 570 and disk drive 580 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 500 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 585 may be any conventional graphics processing unit that may be user programmable. Such GPUs are available from NVIDIA, ATI, and other vendors. In this example, GPU 585 includes a graphics processor 593, a number of memories and/or registers 595, and a number of frame buffers 597.

FIG. 5 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

The various embodiments and aspects discussed herein can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer implemented method of creating autonomous objects in a computer animated movie or game, the method comprising:

receiving, at one or more computer systems, an animation control signal related to an animation object for a first animation control;

generating, with one or more processors associated with the one or more computer systems, two or more corresponding filtered signals in response to filtering the animation control signal with two or more filters, wherein at least one of the two or more filtered signals has a non-zero time offset relative to another of the two or more filtered signals;

generating, with the one or more processors associated with the one or more computer systems, two or more corresponding weighted filtered signals in response to weighting each of the two or more filtered signals;

generating, with the one or more processors associated with the one or more computer systems, a filtered animation control signal based on a combination of the two or more weighted filtered signals; and generating, with the one or more processors associated with the one or more computer systems, information indicative of motion of the animation object based on the filtered animation control signal;

wherein generating, with the one or more processors associated with the one or more computer systems, the information indicative of the motion of the animation object based on the filtered animation control signal comprises applying the filtered animation control signal to a second animation control different than the first animation control.

2. The method of claim 1, wherein generating, with the one or more processors associated with the one or more computer systems, the information indicative of the motion of the animation object based on the filtered animation control signal comprises applying the filtered animation control signal to the first animation control.

3. The method of claim 1, wherein the first animation control includes one of a translation control, a rate control, and/or an acceleration control.

4. The method of claim 1, wherein generating, with the one or more processors associated with the one or more computer systems, the two or more weighted filtered signals in response to weighting each of the two or more filtered signals comprises at least one of an increase or decrease in amplitude or a negative multiplication factor.

5. The method of claim 1, wherein the two or more filters represent the dynamic response of the animation object to acceleration and/or rates.

6. The method of claim 1, wherein generating, with the one or more processors associated with the one or more computer systems, the filtered animation control signal based on a combination of the two or more weighted filtered signals comprises generating a damped harmonic motion signal.

7. The method of claim 1, wherein to generate the filtered animation control signal based on a combination of the two or more weighted filtered signals the set of instructions cause the processor to generate a damped harmonic motion signal.

8. A non-transitory computer-readable medium storing computer-executable code for creating autonomous animation objects, the non-transitory computer-readable medium comprising:
- code for receiving an animation control signal related to an animation object for a first animation control;
- code for generating two or more corresponding filtered signals in response to filtering the animation control signal with two or more filters, wherein at least one of the two or more filter signals has a non-zero time offset relative to another of the two or more filtered signals;
- code for generating two or more corresponding weighted filtered signals in response to weighting each of the two or more filtered signals;
- code for generating a filtered animation control signal based on a combination of the two or more weighted filtered signals; and
- code for generating information indicative of motion of the animation object based on the filtered animation control signal;
- wherein the code for generating the information indicative of the motion of the animation object based on the filtered animation control signal comprises code for applying the filtered animation control signal to a second animation control different than the first animation control.

9. The non-transitory computer-readable medium of claim 8, wherein the code for generating the information indicative of the motion of the animation object based on the filtered animation control signal comprises code for applying the filtered animation control signal to the first animation control.

10. The non-transitory computer-readable medium of claim 8, wherein the first animation control includes one of a translation control, a rate control, and/or an acceleration control.

11. The non-transitory computer-readable medium of claim 8, wherein the code for generating the two or more weighted filtered signals in response to weighting each of the two or more filtered signals comprises code for at least one of an increase or decrease in amplitude and/or a negative multiplication factor.

12. The non-transitory computer-readable medium of claim 8, wherein the two or more filters represent the dynamic response of the animation object to acceleration and/or rates.

13. The non-transitory computer-readable medium of claim 8, wherein the code for generating the filtered animation control signal based on a combination of the two or more weighted filtered signals comprises code for generating a damped harmonic motion signal.

14. A system for creating autonomous objects in a computer animated movie or game, the system comprising:
- a processor; and
- a memory storing a set of instructions which, when executed by the processor, cause the processor to:
- receive an animation control signal related to an animation object for a first animation control;
- generate two or more corresponding filtered signals in response to filtering the animation control signal with two or more filters, wherein at least one of the two or more filtered signals has a non-zero time offset relative to another of the two or more filtered signals;
- generate two or more corresponding weighted filtered signals in response to weighting each of the two or more filtered signals;
- generate a filtered animation control signal based on a combination of the two or more weighted filtered signals; and
- generate information indicative of motion of the animation object based on the filtered animation control signal;
- wherein to generate the information indicative of the motion of the animation object based on the filtered animation control signal the processor is caused to apply the filtered animation control signal to a second animation control different than the first animation control.

15. The system of claim 14, wherein to generate the information indicative of the motion of the animation object based on the filtered animation control signal the set of instructions cause the processor to apply the filtered animation control signal to the first animation control.

16. The system of claim 14, wherein the first animation control includes one of a translation control, a rate control, and/or an acceleration control.

17. The system of claim 14, wherein to generate the two or more weighted filtered signals in response to weighting each of the two or more filtered signals the set of instructions cause the processor to perform at least one of an increase or decrease in amplitude and/or a negative multiplication factor.

* * * * *